United States Patent [19]

Hamada

[11] Patent Number: 4,721,975
[45] Date of Patent: Jan. 26, 1988

[54] FOCUS DETECTING DEVICE

[75] Inventor: Masataka Hamada, Osaka, Japan

[73] Assignee: Minolta Camera Kabushiki Kaisha, Osaka, Japan

[21] Appl. No.: 810,199

[22] Filed: Dec. 18, 1985

[30] Foreign Application Priority Data

Dec. 19, 1984 [JP] Japan .................. 59-269126

[51] Int. Cl.$^4$ .............................. G03B 3/10
[52] U.S. Cl. ..................................... 354/408
[58] Field of Search ................. 354/407, 408

[56] References Cited

U.S. PATENT DOCUMENTS 3,875,401 4/1975 Stauffer ..................... 354/407 X
4,329,033 5/1982 Masunaga et al. .............. 354/408

Primary Examiner—Michael L. Gellner
Attorney, Agent, or Firm—Burns, Doane, Swecker & Mathis

[57] ABSTRACT

A focus detecting device is provided in which at least a line sensor having a plurality of picture elements is used for receiving light having passed through an objective lens to produce image data. The image data is compared with data shifting the image data by a unit of one or more picture elements to calculate the difference therebetween. It is then determined whether this difference exceeds a predetermined range. Various alternative scheme of calculations on the image data, delayed image data, and differences thereof are disclosed and are responsive to an indication of whether the predetermined condition is exceeded, for identifying defocus of the objective lens. These schemes include one in which, when the difference exceeds the predetermined range, the difference data are reduced by a predetermined rate for calculating defocus of the objective lens.

28 Claims, 8 Drawing Figures (A) PRIOR ART (B) PRIOR ART (A)

(B)

(C)

(D)

FOCUS DETECTING DEVICE

BACKGROUND OF THE INVENTION

1. Field of the Invention

The present invention relates to a focus detecting device for a camera.

2. Description of the Prior Art

A type of focus detecting device has been proposed in the prior art for detecting correlation between two object images respectively formed by object lights which have passed through an objective lens at respective first and second portions distant from the optical axis. A principle construction of the optical system used in this type of focus detecting device is shown in FIG. 1. At a position equivalent to a predetermined focal plane (4) of an objective lens (2) (i.e., a film exposure plane) there is disposed a condensor lens (6) and behind this condensor lens are provided a pair of image forming lenses (8) and (10) and a pair of line sensors (12) and (14). Line sensors (12) and (14) are disposed on image forming planes of image forming lenses (8) and (10), and each of them is composed of a CCD (charge coupled device). Therefore, as shown in FIG. 2, in a front focus condition where an object image to be the subject of the focus detection is formed in front of the predetermined focal plane (4) of the objective lens (2), two images formed by image forming lenses (8) and (10) on line sensors (12) and (14) respectively are near the optical axis (18) of the objective lens. In contrast, two images are remote from the optical axis in a rear focus condition where the object image is formed behind the predetermined focal plane (4) of objective lens (2). In an in-focus condition where the object image is formed on the predetermined focal plane (4), the distance between the corresponding points of two images becomes a specific length determined by the construction of the optical system. Accordingly, if the patterns of the light distributions on line sensors (12) and (14) are converted into electrical signals respectively, the focus condition can be found out by comparing these electrical signals to detect the positional relationship between the two images. This type of focus detecting devices is disclosed, for example, in Japanese utility model laid-open publication No. Sho. 55-157220, Japanese Patent laid-open publication Nos. Sho. 52-95221, Sho. 55-45031, Sho. 55-98709, Sho. 55-98710 and Sho. 55-146423 and U.S. Pat. No. 3,875,401. A method for detecting interval between images, according to the prior art is described below with reference to FIG. 3.

In FIG. 3, the line sensors (12), (14) are respectively composed, for example, of 10 and 16 photo diode cells $a_1-a_{10}$, $b_1-b_{16}$. For convenience of description, signs given to each cell also indicate outputs of each cell. Here, plural combinations of ten continuous cells are present in the line sensor (14) and thereby seven sets $B_1$, $B_2, \ldots, B_7$ can be obtained as shown in the figure. The focusing condition is detected by sensing that an image of which set among these seven sets most closely coincides with the image of line sensor (12). For example, it is presumed that an image of line sensor (12) coincides with an image of the set $B_1$ of line sensor (14). Namely, it is assumed that the relation $a_1=b_1$, $a_2=b_2, \ldots$, $a_{10}=b_{10}$ is established between each output of cells $a_1$, $a_2, \ldots, a_{10}$ and each output of cells $b_1, b_2, \ldots b_{10}$. In this case, $$S_1 = |a_1-b_1| + |a_2-b_2| + \ldots + |a_{10}-b_{10}| = 0 \quad (1)$$

$S_1$ is smaller than the result of calculation for image of sets other than set $B_1$ and is minimum in the result of calculation for the images of all sets. First, the calculation described above is carried out for finding a set resulting in such minimum value for the images of respective sets. Next, operation for finding the minimum value from the result of calculation obtained is carried out. The focusing condition is detected as described above.

However, the minimum value of the calculated values thus obtained corresponds to the case wherein the two images most closely coincide together, namely, only when the patterns of the two images are identical and the sensitivity of each pair of sensors are equal. When the identity of the images is not assured, or when the sensors have different sensitivity, the above minimum value does not necessarily correspond to the coinciding state of the two images; consequently the focus detection error. The above relationships are described with reference to FIGS. 4(A) and 4(B). FIG. 4(A) shows an object to be focused on and having a stepwise brightness or tone patterns and the images of frame 20 are assumed to be formed on two sensors (12) and (14). Solid line (out 1) and dot line (out 2) in FIG. 4(B) are graphs indicating the outputs of sensors (12) and (14) for the object to be detected as shown in FIG. 4(A). As shown in the above graphs, let's consider a case where the two outputs are not identical but the difference arises between the outputs at the part corresponding to the bright part of the object to be detected. It will be noted that the graph shows a case where the image on sensor (12) coincides with the image for the third set $B_3$ of sensor (14) and those two outputs are overlapped each other in correspondence to the coincidence of the images. Now, if the two outputs (out 1) and (out 2) are identical to each other, the value S3 calculated by the equation (2) below becomes zero and represents the smallest such value of all such calculations in connection with other aggregated amounts.

$$S3 = \sum_{i=1}^{10} |A_i - B_{i+2}| \quad (2)$$

However, when they are not identical as shown in the above graphs, the calculated value S3 will not become the smallest but rather the value S2 obtained when shifting the graph of output (out 1) to the left by one cell pitch will be smaller. Namely, a detecting error of one pitch may occur. Now, assuming one pitch corresponds to 30μ, the detecting error corresponding to one pitch becomes approximately 1 mm in terms of the detecting error in the optical axis direction of a picture taking lens. The amount of such error may be sufficient to cause a hindrance in the practical use of single reflex lens camera.

Moreover, the optical system associated with the focus detecting apparatus in accordance with the prior art is, as shown in FIG. 2, formed such that the two images formed on the upper and lower sensors will be non-symmetrical with respect to the optical axis (see the direction of the arrows annexed to the images) and this fact lead to spoiling of the identity of the two images. Further, the aberration characteristics of the condenser lens and the secondary image forming lenses cause an image curvature also resulting in the spoiling of identity of images. Although the curvature of image can be improved by employing non-spherical lens for the condenser lens and by using the combination of plural lenses but the improvement is not yet achieved to a satisfactory level. In addition, there are problems with the construction and arrangement of two secondary image forming optical systems to be sufficiently symmetrical with respect to the optical axis of the picture taking lens and this may also result in the non-identity of the two images. Thus, due to the various reasons so far described it is unavoidable that the two images or the output patterns for the images do not become identical. Accordingly, when using the conventional image comparison method, the focus detection error may be unavoidable.

In order to improve such problems, the applicant of the present application proposed, in the pending U.S. patent application Ser. No. 570,012 (filed Jan. 10, 1984), a focus detection system where the differential between output signal train of photo diode cells and that shifted as much as the predetermined photo diode cells is obtained and focus detection is carried out using such differential data. However, attempt of calculation with a digital operation circuit using such differential data results in following problems.

For example, a problem exists in a subtraction operation between two positive integers represented by a series of 8 bits to be carried out in the 8-bit digital operation circuit. Subtraction result becomes maximum when 0 is subtracted from the maximum value 255 of integers indicated by 8 bits and the differencial is 255. On the other hand, subtraction result becomes minimum when 255 is substratacted from 0. In this case, the differential is −255. Namely, a subtraction result between two positive integers indicated by the range of 8 bits ranges from 31 255 to +255. Meanwhile, with reference to Table 1, the positive and negative integers expressed in the range of 8 bits ranges from −128 (10000000 as a complementary number of binary notation) to +127 (01111111 of binary notation) when most significant bit (MSB) is applied to the positive or negative sign bit. 128 in decimal notation is expressed as 10000000 in the binary notation but in the expression introducing negative integers, such binary number corresponds to −128 of decimal numbers. In the same way, −129 of decimal numbers corresponds to 127. As described above, the numbers higher than 128 and lower than −129 cannot be expressed by 8 bits because of inconvenience.

TABLE 1

| Decimal Number | Binary Number |
| --- | --- |
| 130 | 10000010 |
| 129 | 10000001 |
| 128 | 10000000 |
| 127 | 01111111 |
| 126 | 01111110 |
| ... | ... |
| ... | ... |
| 1 | 00000001 |
| 0 | 00000000 |
| −1 | 11111111 |
| −2 | 11111110 |
| ... | ... |
| ... | ... |
| −126 | 10000010 |
| −127 | 10000001 |
| −128 | 10000000 |
| −129 | 01111111 |
| −130 | 01111110 |

As described above, it is sometimes imposible to express subtraction result between two positive integers with 8 bits in the 8 bits operation circuit. This case is called hereinafter as overflow. In case the data including such overflow is used for focus detection, accuracy of focus detection is also deteriorated, because, for example, it is probable that a numerical data 128 is used as −128. In order to avoid such phenomenon it is considered that a number of bits of data memory is increased, for example, to 9 from 8 but microcomputers and memory units available in the market use 8 bits or 16 bits. If a 8-bit microcomputer is used for processing 9-bit data, a memory of, for example, 2-byte, 16-bit width is used, resulting in deterioration in application efficiency of memory and increase of cost. In addition, application of 16-bit microcomputer is undesirable from the point of view of cost performance.

On the other hand, it is also possible to limit the size of data themselves to be subtracted, in order to prevent generation of overflow. As a method for limiting size of data, it is assumed that the output level of a CCD is restricted to within a certain level by limiting the integral time of CCD. For example, an integral time can be limited to a half of that required for obtaining an output level expressed by 8 bits. In this case, an output will be at the level expressed by 7 bits. However, it is not desirable to suppress the level of signal in such a method because it results in deterioration of S/N ratio for the following reason. An image output of CCD includes noise not depending on the length of integral time, in addition to the signal which indicates intensity of light entering respective cells. It is difficult to specify the cause and location of noise generated, but it can be estimated that a high speed logic circuit included in the associated circuits located in the periphery generates continuous fluctuation including high frequency component of power supply voltage which gives noise to the signal. Here, an S/N ratio can be raised for such noise level by increasing signal component. An output signal component of CCD can be raised sufficiently by ensuring sufficient integration time so that an electric current for optical input is integrated within the allowable range of dynamic range of CCD. Therefore, from this point of view, it is undesirable to curtail the integral time because it means a lowering of S/N ratio.

It is also considered as another method that the input level of an AD conversion means be set, so in case sufficient integration time is assured so that an output signal is converted to a 7-bit digital value. However in this case, the following problem is generated. As is well known, it is often the case for an image sensor such as the CCD that a signal of convenient level for the succeeding stages is output by varying the integral time in accordance with the brightness of image to be received. In case intensity of image is low, a longer integral time is required. But a camera providing the auto focus function is often used for taking a picture while it is held by hands. Therefore it is useless to ensure the adequacy of integral time, if generating error in focus detection due to vibration and integration cause interruption in some cases before sufficient integral time has run. For example, the integral time is prepared only for 200 msec while the integral time of 400 msec is intrinsically required. In such a case, when an integral time of 400 msec is given, the signal indicated by 7-bit can be obtained but since a half integral time is given, an output is represented by 6 bits. In case the output is indicated by an 8-bit digital value for the sufficient integral time, it would be indicated by 7 bits for the case where the integral time is inevitably limited to a half as described above. Namely, when it is required to express an output of CCD by 7 bits in maximum, a corresponding AD converted value becomes, for example, 6 bits by giving limitation on the integral time and lowering, as a result, the output level of CCD. Meanwhile, if an output of CCD is expressed by 8 bits in maximum, then 7 bits correspond to an output for which the integral time is limited. In the former case, the size of data is less than that of latter case only by one bit. A large amount of data is desirable for focus detection of high accuracy. For these reasons, it will result in problems to limit an AD converted value of CCD output, from the beginning, to 7 bits which are less than amount of data of digital operation circuit.

SUMMARY OF THE INVENTION

Therefore, it is an object of the present invention to provide a focus detecting device which uses differential signal between outputs of a couple of cells located at different positions of line sensors. A mechanism is provided for assuring detection accuracy despite overflow of differential signal, which effectively utilizes the size of unit data of a digital operation circuit which, when the differential signal is not in the overflow condition, reduces the amount of data of differential signal when it overflows.

The dynamic range of line sensor output is determined in accordance with the data size of digital operation circuit. Whether an overflow condition of said differential signal (called the differential data) has occurred is checked. Differential data is compressed, for example, to ½ its size, therefore requiring 1 less bit, only for the detection cycle in which overflow is generated. Focus detection is then carried out on the basis of such compressed differential data. Differential data is not compressed when overflow is not generated.

Reduction in size of differential data under this scheme results in generally larger differential data than that which would be present when the dynamic range of line sensors corresponds to a smaller number of bits than that of unit data size as in the prior art. Differential data overflowing the unit data size are reduced by half to be accommodated by the unit data size of digital circuitry.

The above and other objects, features and advantages of the present invention will become more apparent from the following description of preferred embodiments of the present invention taken in conjunction with the accompanying drawings.

DETAILED DESCRIPTION OF THE PREFERRED EMBODIMENTS

Figure 1:
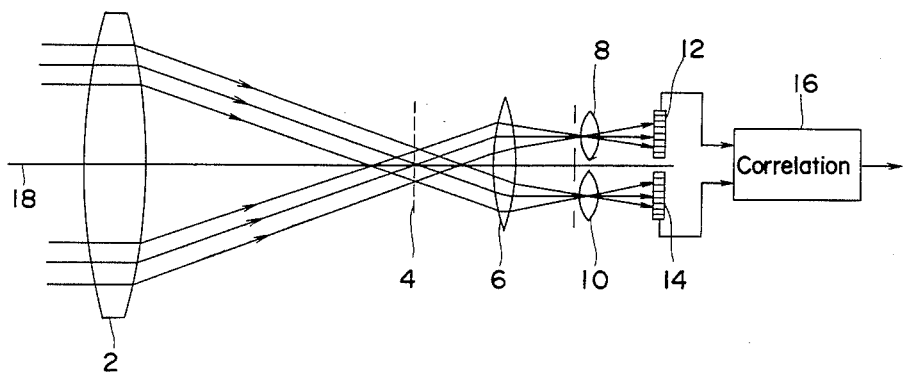
FIG. 1 shows an optical system of a focus detection device of the prior art.
Figure 2:
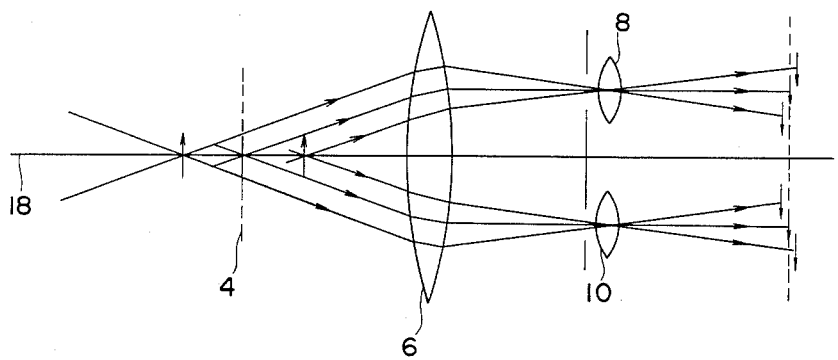
FIG. 2 shows a modified schematic diagram for explaining the operating principle of the device shown in FIG. 1.
Figure 3:
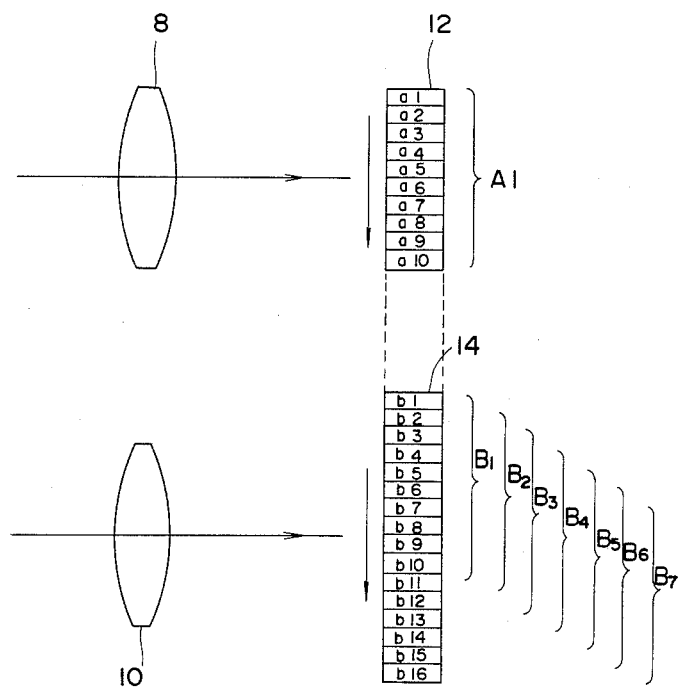
FIG. 3 shows a close up view of a portion of a focus detection device shown in FIG. 1.
Figure 4:
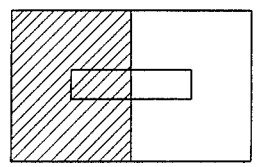
FIG. 4(A) shows an object to be focused by the device of FIG. 1.
FIG. 4(B) is a graph illustrating outputs corresponding to the object of FIG. 4(A).
Figure 4:
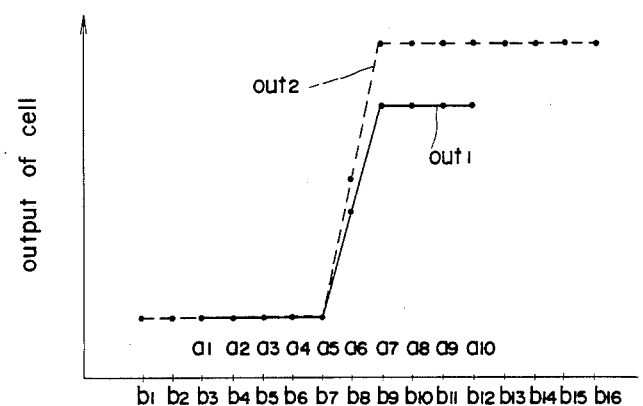
Figure 5:
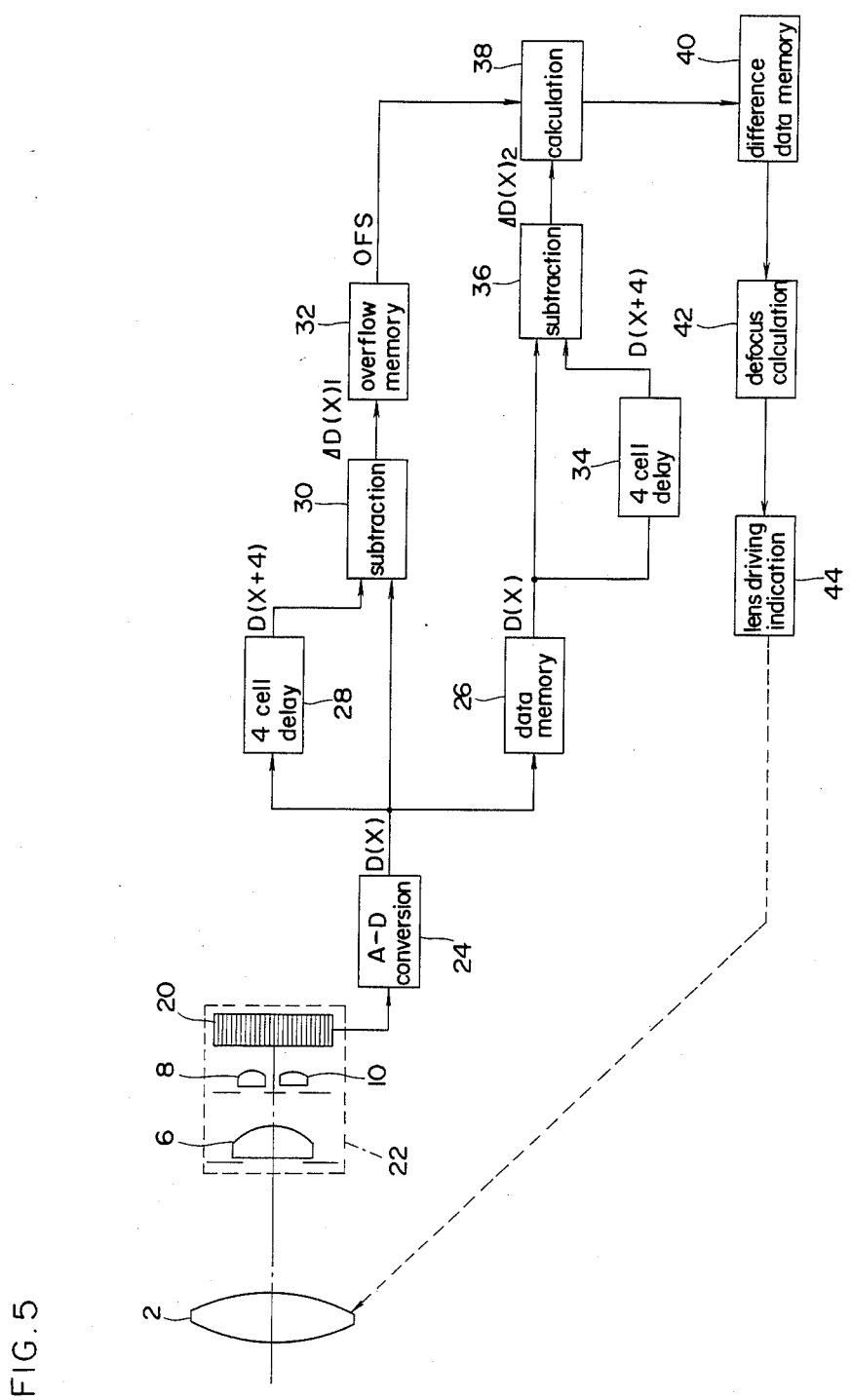
FIG. 5 is a block diagram illustrating a structure of an embodiment of the present invention.
Figure 6:
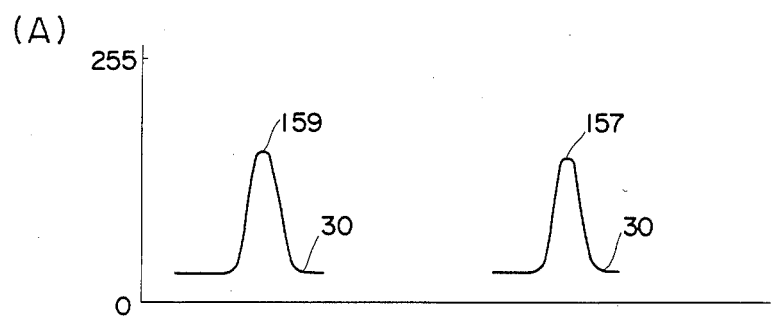
FIGS. 6(A), (B), (C) respectively show graphs for explaining effects of the present invention.
FIG. 6(D) is a front elevation illustrating an example of objective.
Figure 6:
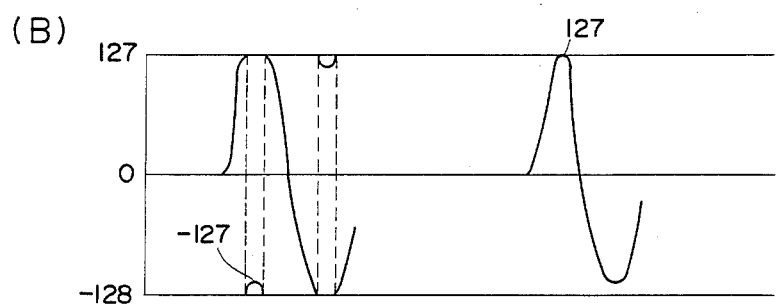
Figure 6:
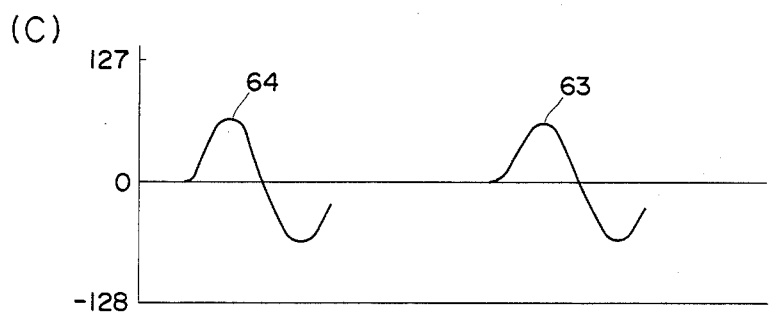
Figure 6:
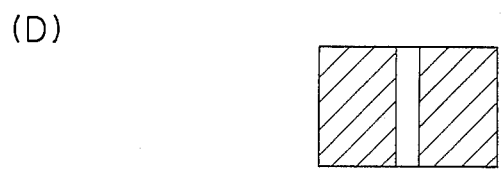

Referring now to FIGS. 5 through 8, wherein like numerals indicate like parts, the subject invention will be discussed in detail. In FIG. 5, a picture taking lens (2) is shown. An AF module (22) including a condenser lens (6), a pair of image forming lenses (8), (10) and a CCD image sensor (20), an integration of the lens sensors (12),(14) shown in FIG. 1, are arranged at the rear side of a predetermined focal plane of the picture taking lens (2). An output of each picture element of CCD image sensor (20) is sequentially converted to digital signal $D(X)$ ($X=1, 2, 3, 4, 5, \ldots$) by an A/D conversion circuit (24). This image signal data $D(X)$ is sequentially sent as input to an image signal memory circuit (26) and is stored therein. Simultaneously with its being inputted to memory circuit (26), it is also inputted to a 4-picture element delay circuit (28) for delay of 4-picture element (4 cells). A subtraction circuit (30) calculates a differential $\Delta D(X)_1$ between an image signal data $D(X)$ and the data $D(X+4)$ and sequentially outputs such differential data $\Delta D(X)_1$. ($\Delta D(X)_1 = D(X+4) - D(X)$) This differential data $\Delta D(X)_1$ is input to an overflow memory circuit (32) for judging whether an overflow occurs or not. If overflow occurs even in any one of all differential data $\Delta D(X)$ in the sensor region to be used for the defocus calculation, the overflow memory circuit (32) sends an overflow signal OFS to an operation circuit (38) described later.

The image signal data $D(X)$ sent from the image signal memory circuit (26) is input to the 4 picture elements delay circuit (34) and it is thereby delayed for the time as long as 4 picture elements. The subtraction circuit (36) sequentially calculates a differential $\Delta D(X)_2$ between the image signal data $D(X)$ sent from the image signal memory circuit (26) and the image signal data $D(X+4)$ sent from the 4 picture element delay circuit (34). This differential data $\Delta D(X)_2$ is sequentially input to the operation circuit (38). If the overflow signal OFS is input from the overflow memory circuit (32), the operation circuit (38) sequentially divides the differential data $\Delta D(X)_2$ sent from the subtraction circuit (36) into ½ and then outputs it. If the overflow signal OFS is not input from the overflow memory circuit (32), the operation circuit (38) directly outputs the differential data $\Delta D(X)_2$ sent from the subtraction circuit (36).

The data sequentially output from the operation circuit (38) is input and sequentially stored in the differential data memory circuit (40). On the basis of such differential data stored in this differential data memory circuit (40), the defocus operation circuit (42) calculates amount and direction of defocus for the predetermined focal plane of the picture taking lens (2). Since, the differential data used for calculation of amount and direction of defocus is previously divided to a half in case the overflow occurs, there is no data which generates overflow within the differential data used for calculation of amount and direction of defocus. Therefore, focus detection error due to overflow is not generated and highly accurate focus detection can be realized because it is no longer necessary to suppress an output level of image signal.

An output of defocus operation circuit (42) is input to a lens drive and display circuit (44) and it is used for focus adjustment and display of focus condition of the picture taking lens (2).

An effect of this embodiment is explained on the basis of the numerical data. FIG. 6(A), (B), (C) show the graphs for such explanation. FIG. 6(D) is a front elevation illustrating an object to be focused. In FIGS. 6(A), (B), (C), the left side curves show the data about the standard portion (corresponding to line sensor (12) of FIG. 1) of CCD image sensor, while the right side curves show the data about the reference portion (corresponding to line sensor (14) of FIG. 1). FIG. 6(A) indicates an image signal data D(X) before calculation of differential. Here, it is assumed that the differential of data "159" and "30" is calculated at the standard portion and the differential of data "157" and "30" at the reference portion. In this case, data "159" is expressed as "1001 1111" by the binary number, "157" as "1001 1101" and "30" as "0001 1110". The actual coincidence between the differential data of standard and reference portions is indicated as $$|(159-30)-(157-30)|=2$$

and this matching must be very high.

However, the differential data obtained by the calculation using a range from 127 to $-128$ in the operation system of 8 bits as shown in FIG. 6(B). Therefore, the differential data of standard portion (159−30=129) indicates $-127$. On the other hand, since the differential data of reference portion is 157−30=127 and does not overflow, a degree of matching becomes $|-127-127|=254$ and is judged as very bad.

In the case of binary number, it must be indicated as $$|1000\ 0001-0111\ 1111|=0000\ 0010$$

but it is indicated as $$|1000\ 0001-0111\ 1111|=|-0111\ 1111-0111\ 1111|=1111\ 1110.$$

In the case of this embodiment, if overflow occurs, since the differential data is divided to a half, the differential data of standard portion becomes "64" (0100 0000), while the differential data of reference portion becomes "63" (0011 1111) as shown in FIG. 6(C). The degree of matching becomes $$|64-63|=1$$

or $$|0100\ 0000-0011\ 1111|=0000\ 0001$$

in the binary number. Therefore, a high degree of matching is correctly detected. Here, the differential data becomes ½ of the true difference when the overflow occurs. But overflow occurs intrinsically when difference is large. Accordingly, it does not give any influence on detection of a degree of matching and is not related to detection of amount and direction defocus.

Figure 7:
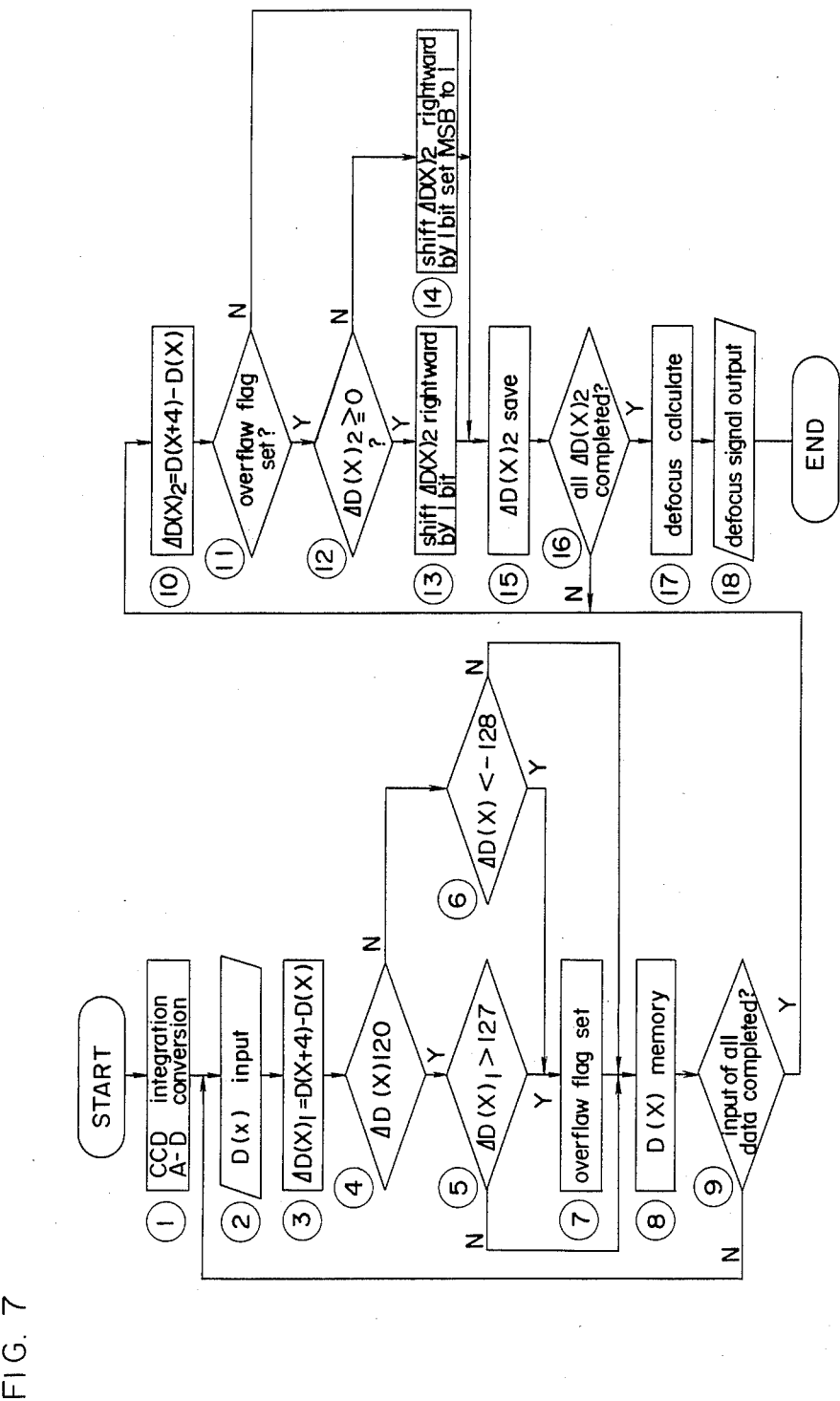
FIG. 7 is a flow chart illustrating operations the embodiment utilizing a microcomputer.

FIG. 7 is a flow chart indicating operation sequence in such a case where a microcomputer is used to the circuit of FIG. 5. Hereinafter, this flow chart is described.

In the step 1, an integral operation of CCD image sensor (20) is carried out and its output is converted to a digital signal in the A/D converting circuit (24). In the step 2, this digital signal is sequentially input as the image signal D(X). (X=1, 2, 3, 4, 5, ...) Next, in the step 3, a differential data between the one image signal data D(X) and the image signal data D(X+4) shifted by 4 picture elements is calculated and a result is defined as $\Delta D(X)_1$.

In the step 4, it is discriminated whether such differential data $\Delta D(X)_1$ is positive or negative. When $\Delta D(X)_1$ is positive or zero, operation proceeds to the step 5 and it is discriminated whether data $\Delta D(X)_1$ is larger or smaller than "127" ("0111 1111" in binary number). Meanwhile, when $\Delta D(X)_1$ is negative, operation proceeds to the step 6, and it is discriminated whether the data $\Delta D(X)_1$ is larger or smaller than "$-128$" ("1000 0000" in binary number). When $\Delta D(X)_1$ is discriminated as to be larger than "127" in the step 5, or $\Delta D(X)_1$ is discriminated as to be smaller than "$-128$" in the step 6, operation proceeds to the step 7 and the overflow flag is set. Namely, in case the differential data $\Delta D(X)_1$ overflows, the overflow flag is set. In case $\Delta D(X)_1$ is discriminated as to be smaller than "127" in the step 5, or $\Delta D(X)_1$ is discriminated as to be larger than "$-128$" in the step 6, operation proceeds to the step 8 skipping the step 7 and the image signal data D(X) is directly saved in the memory.

The operations up to the step 8 from the step 2 are repeated for all image signal data D(X). When it is discriminated in the step 9 whether all image signal data D(X) are input and all differential data $\Delta D(X)_1$ is discriminated whether it overflow or not, operation proceeds to the step 10.

In the step 10, the differential data is calculated as indicated below.

$$\Delta D(X)_2 = D(X+4) - D(X)$$

In the step 11, it is discriminated whether the overflow flag is set or not. When it is discriminated that the overflow flag is set in the step 11, it indicates that the overflow data exists in the differential data. Therefore, operation proceeds to the step 12. In the step 12, it is discriminated whether the differential data $\Delta D(X)_2$ calculated in the step 10 is positive, zero or negative. If the differential data $\Delta D(X)_2$ is positive or zero, operation shifts to the step 13. Meanwhile, if differential data is negative, operation shifts to the step 14. When it is discriminated that the overflow flag is not set in the step 11, operation shifts to the step 15 and the differential data $\Delta D(X)_2$ is directly saved in the memory.

In the step 13 or 14, the differential data $\Delta D(X)_2$ is divided to a half. Namely, this data is shifted to the right only for 1 bit in the step 13 in order to divide the differential data $\Delta D(X)_2$ expressed by the binary number. For example, in case the differential data $\Delta D(X)_2$ is "129" ("$-127$" within a microcomputer), it is expressed as "1000 0001" as a binary number but it is set "0100 0000" after shift to the right by 1 bit in the step 13. This data "0100 0000" corresponds to "64" and as a result "129" is divided to "64". In the same way, in the step 14, data is shifted to the right only for 1 bit in order to divide the differential data $\Delta D(X)_2$ to a half and most significant bit (MSB) is set to "1". For example, in case the differential data $\Delta D(X)_2$ is "$-129$" (namely, "127" in the microcomputer), the data which is expressed as "0111 1111" by a binary number is shifted to the right only for 1 bit in the step 14 and it is converted to "1011 1111" because the MSB is set to "1". This data "1011 1111" corresponds to "−65" and as a result "−129" is divided to "−65". The data calculated in this way is replaced with the old differential data $\Delta D(X)_2$ and the operation shifts to the step 15 and data is saved in the memory. Operations from the step 15 from the step 10 are carried out for all image signal data $D(X)$ and when all differential data $\Delta D(X)_2$ are saved in the memory, operation moves to the step 17 from the step 16.

In the step 17, based on many differential data $\Delta D(X)_2$ stored, amount and direction of defocus for the predetermined focal plane of picture taking lens (2) are calculated. The signals indicating amount and direction of defocus are output from the microcomputer in the step 18 and are used for adjustment and display of focus condition.

In above embodiment, the differential data used for calculation of defocus is divided to a half in case the overflow is previously detected, but the present invention is not limited only to such concept. For example, it is also possible to divide the image signal data $D(X)$ itself to a half in case overflow is previously detected.

Figure 8:
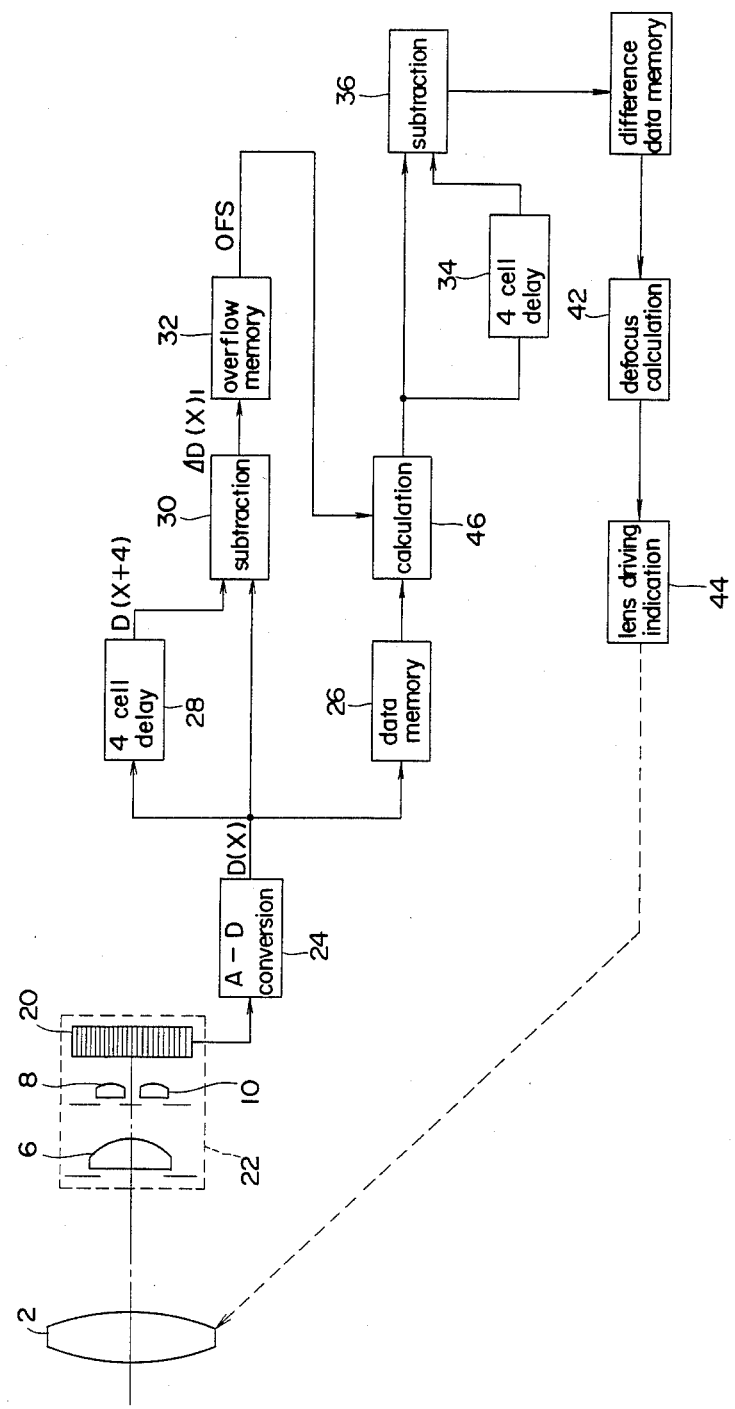
FIG. 8 is a block diagram illustrating a structure of another embodiment of the present invention.

FIG. 8 is a block diagram indicating such example. In FIG. 8, the parts having the like function as those in FIG. 5 are given the like symbols and description about them is omitted. In this embodiment, when the overflow signal OFS is output from the overflow memory circuit (32), the operation circuit (46) sequentially divides the image signal data $D(X)$ sent from the image signal memory (26) to a half and outputs such signals. If the overflow signal OFS is not output, the operation circuit (46) directly outputs the image signal data $D(X)$. An output signal of operation circuit (46) is respectively input to the subtraction circuit (36) and 4 picture elements delay circuit (34) and the differential data $\Delta D(X)_2$ is calculated by the subtraction circuit (36). This differential data $\Delta D(X)_2$ is sequentially stored in the differential signal memory circuit (40) and is used for calculation of defocus.

In above embodiment, the differential data is divided to a half in case the overflow is detected, but the present invention is not limited division by half. What is required is a reduction of the output level of the differential data.

As described previously, in the present invention, focus detection error due to the overflow can be eliminated and accurate focus detection result can be obtained without deterioration of S/N ratio due to reduction of output signal. In the case of present invention, the data used for calculation is reduced than the data sent from the light sensing means when the overflow is to be generated, but there is no problem because the differential data itself is large in case the overflow is generated.

What is claimed is:

1. A focus detecting device for detecting focusing condition of an objective lens comprising:
    means for receiving light having passed through said objective lens, including a plurality of picture elements arranged in sequence, said picture elements each producing an output corresponding to light received thereby, said picture element outputs collectively forming image data;
    means for calculating a difference between said image data and data formed by shifting said image data by a unit of one or more picture elements to produce difference data;
    means for discriminating whether said difference data is over a predetermined signal range, and to produce an overflow signal when said difference data is over the predetermined signal range; and
    means for calculating defocus of said objective lens in accordance with data formed by reduction of said diifference data in response to said overflow signal.

2. A focus detecting device as claimed in claim 1, wherein said discriminating means includes means for computing a difference between said image data and data formed by shifting said image data by a unit of one or more picture elements, and means for discriminating whether said difference data is over a predetermined signal range in accordance with the computed difference.

3. A focus detecting device as claimed in claim 1, wherein said defocus calculating means includes means for computing a difference between said image data and data formed by shifting said image data by a unit of one or more picture elements to produce difference data, and means for selectively producing data so as to produce said difference data when said overflow signal is not received, and to produce reduction data formed by reducing said difference data by a predetermined rate when said overflow signal is received, and means for detecting defocus of said objective lens in accordance with the data produced by said selective producing means.

4. A focus detecting device as claimed in claim 1, wherein said defocus calculating means includes means for selectively outputting data so as to output said image data when said overflow signal is not received, and to output reduction data formed by reducing said image data by a predetermined rate when said overflow signal is received, means for calculating a difference between said output data for said selective outputting means and data formed by shifting said output data by a unit of one or more picture elements to produce secondary difference data, and means for detecting defocus of said objective lens in accordance with said secondary difference data.

5. A focus detecting device as claimed in claim 1, wherein said receiving means serially produces said image data picture element output by picture element output, and wherein said difference calculating means includes means for delaying said image data by a unit of one or more elements to produce delayed image data, and means for subtracting said image data and said delayed image data on each corresponding picture element.

6. A focus detecting device as claimed in claim 5, wherein said discriminating means includes a flag which is set when said subtraction value is over said predetermined signal range.

7. A focus detecting device as claimed in claim 6, wherein said defocus calculating means includes means for delaying said image data by a unit of one or more picture elements to produce secondary delayed image data, means for subtracting said image data and said secondary delayed image data on each corresponding picture element, means for selecting data so as to produce said subtraction result when said flag is not set, and to produce reduction data formed by reducing said subtraction result by a predetermined rate when said flag is set, and means for detecting defocus of said objective lense in accordance with said provided data.

8. A focus detecting device as claimed in claim 6, wherein said defocus calculating means includes means for selectively outputting data so as to output said image data when said flag is not set, and to output reduction data formed by reducing said image data by a predetermined rate when said flag is set, means for calculating a difference between said output data from said selective outputting means and data formed by shifting said output data by a unit of one or more picture elements to produce secondary difference data, and means for detecting defocus of said objective lens in accordance with said secondary difference data.

9. A focus detecting device as recited in claim 1, wherein said defocus calculating means calculates defocus of said objective lens in accordance with unreduced difference data in the absence of said overflow signal.

10. A focus detecting device for detecting focusing condition of an objective lens, comprising:
    means including a plurality of picture elements in sequence, for receiving light having passed through said objective lens, each said picture element providing an output corresponding to light received thereby, the collective output of said image elements forming image data;
    means for shifting said image data by a unit of one or more picture elements in said sequence;
    means for taking the difference between said image data and said shifted data to yield difference data;
    means for determining whether said difference data exceeds a predetermined range and for generating an overflow signal upon a positive determination;
    means responsive to said overflow signal for reducing one of said image data and said difference data to provide reduced data;
    means for calculating defocus of said objective lens in accordance to said reduced data when said overflow signal is generated.

11. A focus detecting device as recited in claim 10, wherein said defocus calculating means calculates defocus of said objective lens in accordance with one of said image data and said difference data in the absence of said overflow signal.

12. A focus detecting device as recited in claim 10, wherein said reducing means reduces said difference data in response to said overflow signal.

13. A focus detecting device as recited in claim 12, wherein said defocus calculating means calculates defocus of said objective lens in accordance with said difference data in the absence of said overflow signal.

14. A focus detecting device as recited in claim 11, wherein said reducing means reduces said image data responsive to said overflow signal; and
    said defocus calculating means calculates defocus of said objective lens in accordance with said image data in the absence of said overflow signal.

15. A focus detecting device as recited in claim 14, wherein said defocus calculating means includes:
    means for shifting said reduced image data by one or more picture elements, responsive to said overflow signal, and for shifting said image data by one or more picture elements, in the absence of said overflow signal;
    means for taking the difference between said reduced image data and said shifted reduced image data or between said image data and said shifted image data, depending on whether said overflow signal is present, to yield secondary difference data; and
    means for calculating defocus of said objective lens in accordance with said secondary difference data.

16. A focus detecting device as recited in claim 12, wherein said receiving means serially produces said image data picture element output by picture element output, said shifting means including means for delaying said image data by a unit of one or more picture elements to produce delayed image data, and said difference taking means is operative to subtract said image data and said delayed image data on each corresponding picture element.

17. A focus detecting device as recited in claim 16, wherein said determining means includes a flag which is set when any one of said subtracted values exceeds said predetermined range.

18. A focus detecting device as recited in claim 10, wherein said receiving means serially produces said image data picture element output by picture element output, said shifting means including means for delaying said image data by a unit of one or more picture elements to produce delayed image data, and said difference taking means is operative to subtract said image data and said delayed image data on each corresponding picture element;
    said determining means includes a flag which is set when any one of said subtraction values exceeds said predetermined range;
    said reducing means reducing said subtraction results by a predetermined rate when said flag is set; and
    said defocus calculating means calculates defocus of said objective lens in accordance with said subtraction results when said flag is not set.

19. A focus detecting device as recited in claim 10, wherein:
    said receiving means serially produces said image data picture element output by picture element output, said shifting means including means for delaying said image data by a unit of one or more picture elements to produce delayed image data, and said difference taking means is operative to subtract said image data and said delayed image data on each corresponding picture element;
    said determining means includes a flag which is set when any one of said subtraction values exceeds said predetermined range;
    said reducing means reducing said image data by a predetermined rate when said flag is set;
    said defocus calculating means comprising:
        means for shifting said reduced image data by one or more picture elements when said flag is set and for shifting said image data by one or more picture elements when said flag is not set;
        means for taking the difference between said reduced image data and said shifted reduced image data or between said image data and said shifted image data, depending on whether said flag is set, to yield secondary difference data; and
        means for calculating defocus of said objective lens in accordance with said secondary difference data.

20. A focus detecting device for detecting focusing condition of an objective lens, comprising:
    means, including a plurality of picture elements in sequence, for receiving light having passed through said objective lens, each said picture element providing an output corresponding to light received thereby, the collective output of said picture elements forming image data;

means for shifting said image data by a unit of one or more picture elements in said sequence;

means for calculating using said image data and said shifted image data to yield calculated data;

means for determining whether said calculated data exceeds a predetermined range and for generating an overflow signal when said calculated data exceeds the predetermined range;

means, responsive to said overflow signal, for reducing one of said image data and said calculated data to provide reduced data; and means for calculating defocus of said objective lens in accordance with said reduced data when the overflow signal is generated.

21. A focus detecting device as recited in claim 20, wherein said defocus calculating means calculates defocus of said objective lens in accordance with one of said image data and said calculated data in an absence of said overflow signal.

22. A focus detecting device as recited in claim 20, wherein said reducing means reduces said calculated data in response to said overflow signal.

23. A focus detecting device as recited in claim 22, wherein said defocus calculating means calculates defocus of said objective lens in accordance with said calculated data in an absence of said overflow signal.

24. A focus detecting device as recited in claim 20, wherein said reducing means reduces said image data responsive to said overflow signal; and said defocus calculating means calculates defocus of said objective lens in accordance with said image data in an absence of said overflow signal.

25. A focus detecting device as recited in claim 24, wherein said defocus calculating means includes:

means for shifting said reduced image data by one or more picture elements, responsive to said overflow signal, and for shifting said image data by one or more picture elements, in the absence of said overflow signal;

means for taking a difference between said reduced image data and said shifted reduced image data or between said image data and said shifted image data, depending on whether said overflow signal is present, to yield secondary difference data; and means for calculating defocus of said objective lens in accordance with said secondary difference data.

26. A focus detecting device as recited in claim 20, wherein said receiving means serially produces said image data picture element output by picture element output, said shifting means including means for delaying said image data by a unit of one or more picture elements to produce delayed image data, and said calculation means is operative to subtract said image data and said delayed image data on each corresponding picture element.

27. A focus detecting device for detecting focusing condition of an objective lens, comprising:

means, including a plurality of picture elements, for receiving light coming from an object to be focused, each said picture element providing an output corresponding to light received thereby, the collective output of said picture elements forming first data;

means for producing second data in accordance with said first data;

means for determining whether said second data exceeds a predetermined range and for generating an overflow signal when said second data exceeds the predetermined range;

means, responsive to said overflow signal, for reducing one of said first and second data to provide reduced data; and means for calculating defocus of said objective lens in accordance with said reduced data when the overflow signal is generated.

28. A focus detecting device as recited in claim 27, wherein said light receiving means includes means for accumulating the output of each picture element to produce an accumulated signal in an analog form, and means for converting said analog accumulated signal into a corresponding digital signal, a collection of said digital signals forming the first data, and wherein said second data producing means includes means for forming said second data on the basis of said collection of said digital signals.

* * * * *